Patented July 6, 1937

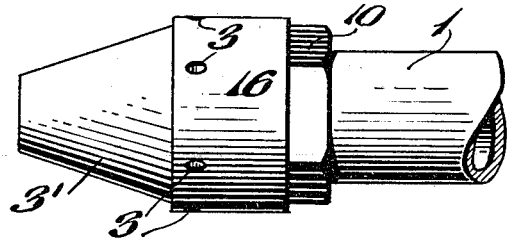

2,086,071

UNITED STATES PATENT OFFICE 2,086,071

LUBRICATING NOZZLE

Fred Henry Ehnts, Philadelphia, Pa.

Application May 9, 1936, Serial No. 78,833

2 Claims. (Cl. 285—161)

My invention relates generally to geasing or lubricating apparatus and more particularly to improvements in back-pressure indicating nozzles through which grease is discharged into bearings.

One of the objects is to provide a nozzle that is readily applied to the filling vent of a bearing for the purpose of filling the bearing with the required quantity of grease at a predetermined and durable operating pressure. In the specialized field of bearing lubrication, the practice has been heretofore to inject the grease into a bearing under pressure without a means of ascertaining whether the pressure is adequate or not. Not infrequently the zealous operator in a spirit of excess caution fills the bearing with grease under too great a pressure, thus expressing a faulty lubricating technique that may result in heating the grease excessively and cause the bearing to run "hot" and to become irreparably damaged. My invention avoids the hazards of direct pressure greasing by indicating in a visible manner when the bearing is filled with the required quantity of grease under a proper pressure.

Another object of my invention is to provide a nozzle that will indicate to the operator any irregular or unanticipated obstruction existent in the bearing that may be caused by solidified grease or other factors. Should the bearing really require greasing and, nevertheless, the nozzle expels grease from its rear surface when the gun discharges grease into the bearing, the operator is immediately apprised of a defective condition in the bearing that may be imputable to a number of causes.

A further object of my invention is to provide a nozzle that can be readily adjusted to serve as a direct high pressure discharging nozzle to be attached to a pressure gun of either the continuous or intermittent feeding type.

An additional object of my invention is to provide a nozzle of the type referred to which can be readily and detachably applied to a vent in a bearing housing and be maintained in more or less permanent association with a bearing in order that a grease gun can, when the occasion requires, be quickly engaged with a bearing and its associated nozzle for the purpose of supplying grease.

For the purpose of illustrating my invention I have shown in the accompanying drawing forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

My invention relates to several other novel features of construction and advantage appearing as hereinafter described and claimed in connection with the accompanying drawing in which:

Fig. 1 represents a side elevation of the nozzle.

Fig. 2 represents a longitudinal sectional view of the nozzle shown in Fig. 1.

Fig. 3 represents a transverse sectional view of the nozzle taken on line 3—3 of Fig. 2.

Fig. 4 represents a longitudinal sectional view of the nozzle adapted to become a fitting of a bearing.

Fig. 5 represents a rear elevation of the nozzle shown in Fig. 4.

Referring to the drawing in which like reference numerals indicate like parts and with initial reference to Fig. 4, I is a length of metal tubing that may be pressed straight or angled and which is attached at one end through a universal joint (not shown) to a metering or measuring grease gun (not shown). At the other end the tube I engages threadedly with the cap 2 which in a manner similar to a ferrule engages threadedly with the orifice element 3'. The cap 2 is perforated with a plurality of holes 9, constant in diameter and distributed uniformly on a circumference concentric with the external periphery of the cap 2. The orifice element 3' approximates in shape and contour a truncated hollow cone with its smaller open end 4 adapted to engage threadedly with a threaded vent 5 of the bearing housing 6. The base or the larger opening 7 of the orifice element 3' is threaded to engage the cap 2. Over the tube I and bearing on the cap 2 is the perforated washer 8, the holes 3 of which are distributed on a circumference that coincides with a similar circumference on the cap 2 but the diameters of which vary slightly between close limits. The washer 8 can be rotated freely about the tube I and, accordingly, can be set in an indefinite number of positions relatively to the perforated cap 2, ranging from a position in which all of the perforations of the cap 2 are closed to a position in which all of the aforesaid perforations are open. The lock nut 10 threaded to engage the tube I serves to hold securely the washer 8 in any predetermined relationship with the cap 2.

A thin walled cylindrical tube 11 is fitted snugly into the smooth bore of the threaded tube 1 and is adjustable in that its end 12 can be advanced toward or withdrawn from the smaller end of the orifice element 3'. If the distance A is decreased then the back pressure at which the excess grease is extruded from the bearing 6 is increased; and if the distance A is increased then the excess grease from the filled bearing 6 exudes at a reduced back pressure. A check valve consisting of the pin 13, the spring 14 and the ball 15 is inserted in the tubing 1 when the nozzle is attached to the bearing 6 as a fitting.

Figures 1 and 2 represent a modified type of the nozzle adapted by virtue of its more slender design to the lubrication of small bearings directly by attachment to a measuring or metering gun. The structure of the modified type of nozzle is virtually the same as that illustrated in Figure 4 and embodies the same scientific principles. However, in order that the small bearings on small apparatus may become more accessible to the grease gun, the cap 16 is freely rotatable about the tubing 1 and is perforated with a plurality of holes 3, slightly variable in diameter and distributed uniformly on its lateral surface. The holes 3 are registrable with the openings 17 of constant diameter and distributed in coincidental relationship with holes 3 of the cap 16 on the lateral surface of the orifice element 3'. The cap 16 can be rotated freely about the tube 1 and, accordingly, can be set in an indefinite number of positions relatively to the perforated orifice element 3', ranging from a position in which all of the aforesaid perforations of the orifice element 3' are closed to a position in which all of the aforesaid perforations are open. The lock nut 10, threaded to engage the tubing 1, serves to hold securely the cap 16 in any predetermined relationship with the orifice element 3'.

The manner in which my device can be utilized becomes obvious when its operation is more fully described. The grease gun is of the metering or measuring type and with every release of its trigger a definite quantity of grease, approximately .07 oz., is discharged, as indicated by the solid arrow, through the orifice element opening 4 into the filling vent 5 of the bearing 6. For greasing a bearing to which a nozzle like that shown in Figure 4 has been attached, the grease gun is coupled with the tube 1. In order that the pressure of the grease be maintained at a definite and prescribed pressure the washer 8 is rotated to such a degree that its holes 3 coincide with the perforations 9 of the cap 2, thus affording a plurality of unobstructed passage ways throughout the enlarged end 18 of the nozzle. When a sufficient quantity of grease at a proper pressure has been admitted to the bearing 6 then the excess grease is expelled at a pressure of approximately 2.5 ounces along the paths indicated by the broken arrows in Figure 4 through the perforations 9 and 3, indicating immediately to the operator that the bearing 6 has been correctly and adequately greased.

Should the operator desire, he can quickly release the lock nut 10, rotate the washer 8 in such a manner that the perforations 9 are closed, and proceed to use the nozzle and any type of gun as a pressure gun.

The operation of the slender nozzle as illustrated in Figures 1 and 2 is substantially the same, excepting of course its attachment to the grease gun and its provision for the lateral extrusion of the excess grease.

In other words, the type of nozzle as illustrated in Figure 2 is first attached to a grease gun and the combined unit of a gun and nozzle is brought to the bearing requiring the application of grease. Whereas, the type of nozzle as shown in Figure 4 is permanently attached as a fitting to the bearing and to it a grease gun is brought and attached for the purpose of applying grease to the bearing.

While the constructions as shown and described are the preferred embodiments of my device, nevertheless the same may be modified in detail without departing from the spirit and the scope of the invention as defined in the annexed claims.

Having thus described my invention, what I claim as new and desire to secure by Letters Patent is:

1. A nozzle comprising a delivery tube adapted to be attached to the outlet of a grease gun in combination with an orifice element, said orifice element having a forwardly directed outlet orifice spaced from but in coaxial alignment with the open end of said delivery tube and a circumferential series of sidewardly directed orifices, an annular cap adapted to engage with said orifice element and having a circumferential series of sidewardly directed openings therein, a tube in a telescopic relation with the open end of said delivery tube by the adjustment of which the distance between the effective end of said tube and said forwardly directed outlet orifice of said orifice element may be varied, and a means for holding said annular cap in any desired degree of registration with said sidewardly directed orifices of said orifice element.

2. A nozzle comprising an orifice element in combination with a tube in adjustable relationship with said orifice element, said orifice element having a circumferential series of sidewardly directed orifices, an annular cap having a circumferential series of sidewardly directed openings therein and adapted to engage with said orifice element, a delivery tube adapted to engage with said annular cap and orifice element, and a means for holding said annular cap in any desired degree of registration with said sidewardly directed orifices of said orifice element.

FRED HENRY EHNTS.